United States Patent
Huang

(10) Patent No.: US 8,786,197 B2
(45) Date of Patent: Jul. 22, 2014

(54) METHOD AND SYSTEM FOR ADJUSTING LIGHT OUTPUT FROM A LIGHT SOURCE

(75) Inventor: Hsin-Chieh Huang, Hsinchu (TW)

(73) Assignee: TSMC Solid State Lighting Ltd., Hsin-Chu (TW)

( * ) Notice: Subject to any disclaimer, the term of this patent is extended or adjusted under 35 U.S.C. 154(b) by 738 days.

(21) Appl. No.: 12/912,948

(22) Filed: Oct. 27, 2010

(65) Prior Publication Data

US 2012/0104954 A1     May 3, 2012

(51) Int. Cl.
    *H05B 37/02*     (2006.01)
(52) U.S. Cl.
    CPC ........ *H04B 33/0851* (2013.01); *H05B 37/0218* (2013.01)
    USPC .......... 315/151; 315/158; 345/102; 345/204; 345/207
(58) Field of Classification Search
    CPC . Y02B 20/46; H05B 33/0851; H05B 37/0218
    USPC .......... 315/169.1, 169.3, 291, 307, 149–158, 315/308–309, 312; 362/294, 296, 547, 545; 345/207, 175, 102, 204
    See application file for complete search history.

(56) References Cited

U.S. PATENT DOCUMENTS

| | | | |
|---|---|---|---|
| 6,853,151 B2 * | 2/2005 | Leong et al. | 315/185 R |
| 7,190,126 B1 * | 3/2007 | Paton | 315/308 |
| 7,619,597 B2 * | 11/2009 | Nathan et al. | 345/82 |
| 2007/0188425 A1 * | 8/2007 | Saccomanno | 345/82 |
| 2008/0136336 A1 * | 6/2008 | Kalnitsky et al. | 315/158 |
| 2010/0096993 A1 * | 4/2010 | Ashdown et al. | 315/113 |

* cited by examiner

*Primary Examiner* — Douglas W Owens
*Assistant Examiner* — Borna Alaeddini
(74) *Attorney, Agent, or Firm* — Haynes and Boone, LLP

(57) ABSTRACT

A system having a light guide adapted to collect light from a light source, a light detector attached to the light guide, a controller electrically connected to an output of the light detector, and a driver for driving the light source detachably connected to an output of the controller. The driver includes a memory that stores a calibration value for the light source.

20 Claims, 4 Drawing Sheets

METHOD AND SYSTEM FOR ADJUSTING LIGHT OUTPUT FROM A LIGHT SOURCE

FIELD OF THE INVENTION

The present disclosure relates generally to a method and system for a portable device that measures and adjusts the output of light-emitting diodes (LEDs).

BACKGROUND

An LED is a semiconductor based light source including a semiconductor diode and optionally photoluminescent phosphor material, also referred to herein as phosphor, for generating a light at a specified wavelength or a range of wavelengths. LEDs are traditionally used for indicator lamps and are increasingly used for displays, such as liquid-crystal displays (LCDs).

An LED emits light when a voltage is applied across a p-n junction formed by oppositely doped semiconductor compound layers. The wavelength of the light generated by the p-n junction depends on the band gaps of the semiconductor layers used to fabricating an active layer within the p-n junction of the LED. Thus, a specific p-n junction will emit only a narrow band of wavelengths. Additional phosphor materials are included in some LEDs as a coating over the LED. Light generated by the p-n junction that strikes the phosphors is converted up or down by the phosphors to a different wavelength. Thus, in addition to the wavelength of light emitted by the p-n junction, the LED emits other wavelengths from the phosphors. A typical white light LED, for example has a p-n junction that emits blue light. A portion of the blue light is converted to red and green light by the phosphors so that the total light output by the LED appears white.

As the LED is subjected to repeated use, the p-n junction within the LED begins to decay. As a result, over time the light intensity of the LED will drop. Further, the phosphors also decay at different rates with respect to each other and the p-n junction. Thus, the color of an LED with phosphors will also change with time.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
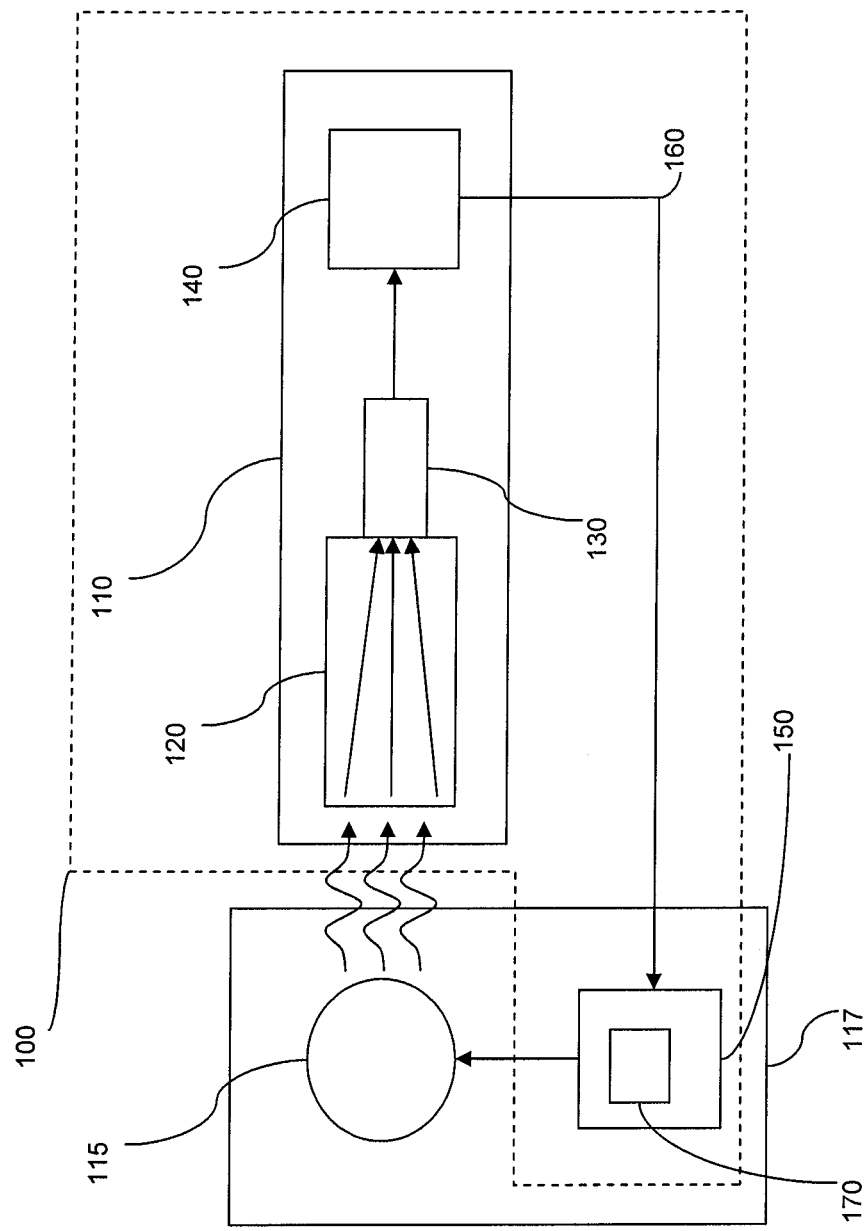
FIG. 1 is a high level functional block diagram of components of a light-adjusting system according to an embodiment.

It is understood that the following disclosure provides many different embodiments, or examples, for implementing different features of the present disclosure. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Various embodiments of the present disclosure pertain to a system that detects and adjusts the light output of an electrical device that has light source. Some embodiments of the present disclosure include a hand-held, portable device.

FIG. 1 is a diagram of a light-adjusting system 100. The light-adjusting system 100 comprises a portable light-detecting portion 110. This portable light-detecting portion 110 is designed to measure and detect the intensity value of light output from a light source 115 of an electrical device 117. The portable light-detecting portion 110 includes a light collecting and guiding portion 120 and a light detector 130. The light collecting and guiding portion 120 collects the light output from the light source 115 at a particular location of a target electrical device, for example, the display screen of a liquid crystal display. The light collecting and guiding portion 120 guides the light to the light detector 130. In various embodiments, the light collecting and guiding portion 120 is a known light guiding mechanism such as an optical fiber, a light pipe, a covered trench in a substrate. In various embodiments, the light detector 130 detects various light properties, such as intensity, color, color temperature or spectral distribution either separately or simultaneously.

The light detector 130 includes a photo sensor or photometer. In various embodiments, the photo sensor is a charge-coupled device, a complementary metal oxide semiconductor (CMOS) sensor, a phototransistor, a photoresister, a photovoltaic cell such as a solar cell or an LED configured to operate as a light detector. In some embodiments, a single collecting and guiding portion 120 is connected to a single light detector 130. In some embodiments, more than one light collecting and guiding portion 120 is connected to a single light detector 130. In some embodiments, light collecting and guiding portion 120 is connected to more than one light detector 130. A controller 140 is connected to the light detector 130. Light output information detected by the light detector 130 is sent to the controller 140.

The light-adjusting system 100 further comprises a driver 150. The controller 140 analyzes the light output information and controls the driver 150 that controls the power being supplied to the light source 115. In some embodiments, the controller 140 increases the power supplied to the light source 115 by the driver 150 if the measured light intensity is lower than a predetermined threshold value. The controller 140 decreases the power supplied to the light source 115 by the driver 150 if the measured light intensity is greater than the predetermined threshold value. Thus, the light output by the light source 115 substantially matches the predetermined threshold value when controlled by the controller 140.

In some embodiments, the controller 140 controls the color output by the light source 115 to be a predetermined color value rather than a predetermined intensity. For example, if the light source comprises red, green and blue LEDs, the ratios of power supplied to each color LED is adjusted separately by the controller 140 using the driver 150. Thus, the color of the output light is adjusted to match the predetermined color value.

The light-adjusting system 100 further comprises a connection 160. The connection 160 connects the driver 150 is to the controller 140. Based on instructions received from the controller 140, the driver 150 adjusts the electrical power supplied to the light source 115. One example of such light a source would be an LED of an LED backlighting plate in an LCD display device.

In some embodiments, the light source 115 is an LED. In some embodiments, the light source 115 is an incandescent bulb, a florescent tube, compact florescent bulb, electroluminescent emitter or an organic LED. In other embodiments the light source 115 is any combination of one or more of the above light sources.

The driver 150 is part of electrical device 117. In some embodiments, the driver 150 is external to the electrical device 117.

The driver 150 has a memory 170 that stores a calibration value for the power for the light source 115 that is determined by the controller 140. If the controller 140 is controlling the driver 150, the controller updates the memory 170 with new values based on the controlled power supplied to the light source 115. If the driver 150 is disconnected from the controller 140, the driver 150 will continue to supply the correct power to the light source 115 based on the values stored in the memory 170.

In some embodiments, the controller 140 is placed in the driver 150 rather than the portable light-detecting portion 110. Further, the connection 160 sends the signal output from the light detector 130 to the controller 140. If the light detector 130 is connected to the controller 140 and the controller is controlling the driver 150, the controller updates the memory 170 with new values based on the controlled power supplied to the light source 115. If the controller 140 is disconnected from the light detector 130, the driver 150 continues to supply the correct power to the light source 115 based on the values stored in the memory 170.

Figure 2:
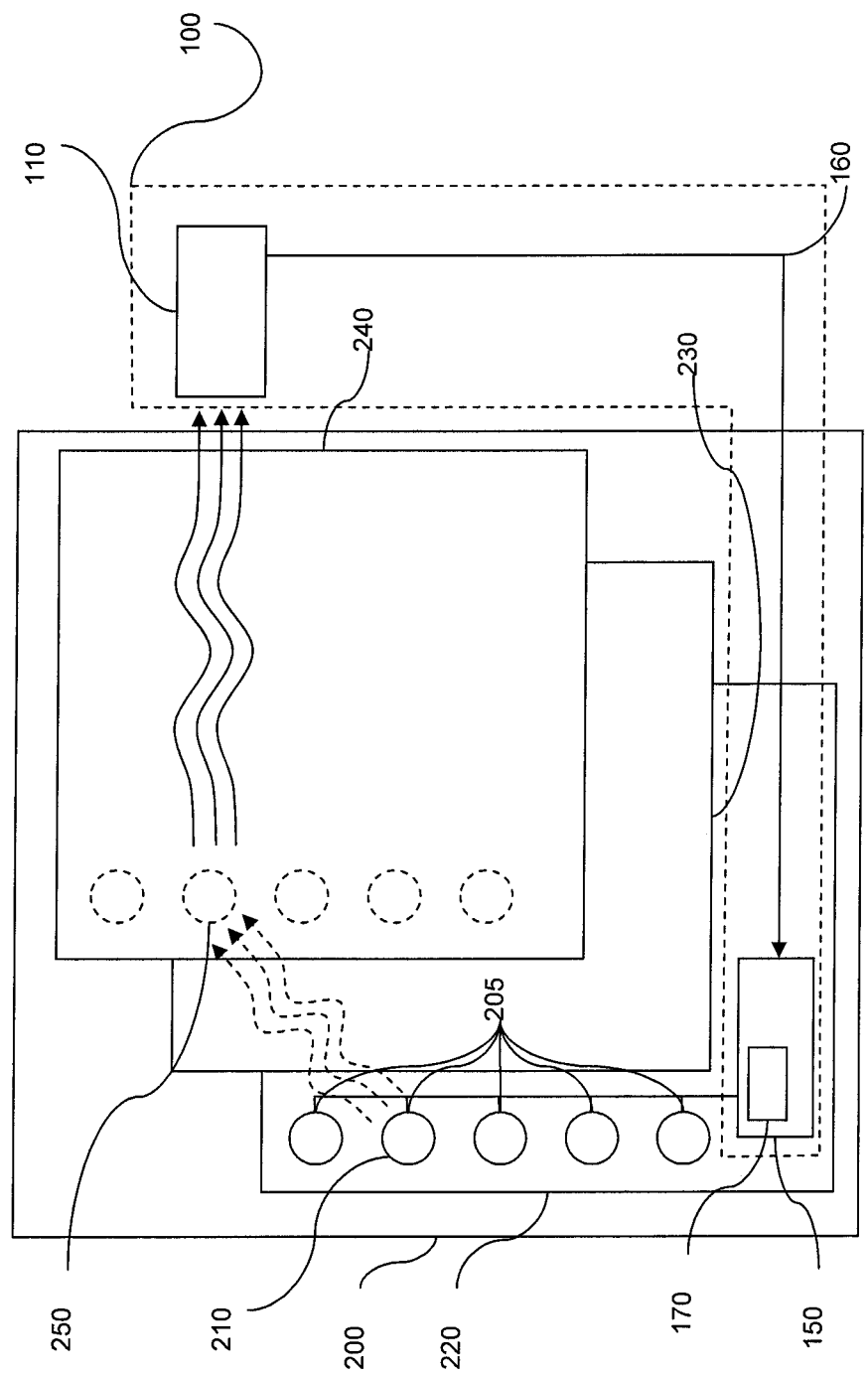
FIGS. 2 and 3 are high level perspective views of two LCD displays incorporating the light-adjusting system according to an embodiment.
Figure 3:
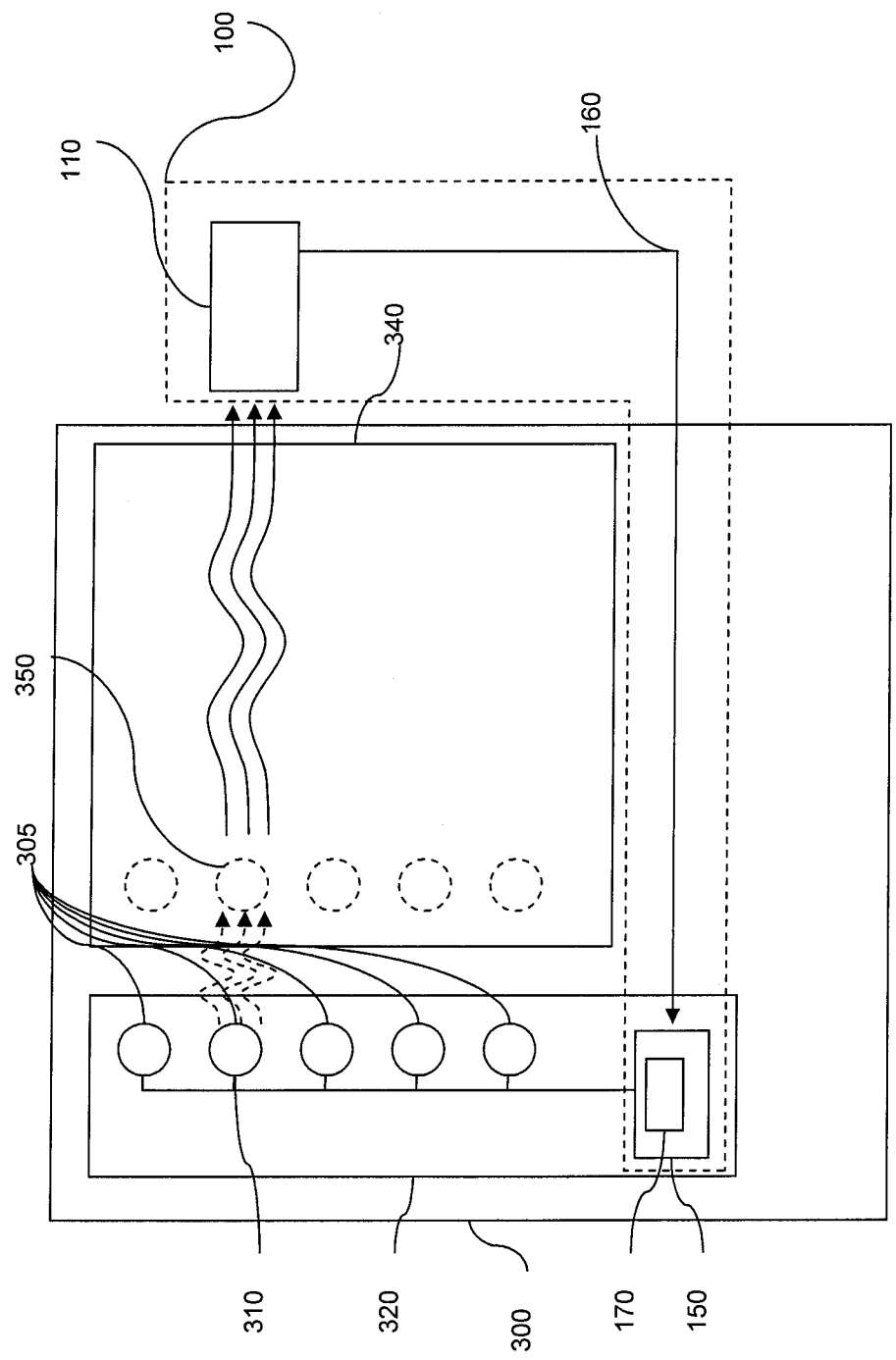

FIGS. 2 and 3 are high level perspective views of the light-adjusting device 110 used to adjust a backlight output of LED display devices 200 and 300 respectively. LED display devices 200 and 300 are LCD display panels that use LEDs as light sources for backlighting.

With regard to FIG. 2, LED display device 200 is an LCD display panel with direct-type LED backlighting. In an LCD display device 200 with direct-type LED backlighting, LEDs 205 are distributed on an LED backlighting plate 220. The LED backlighting plate 220 is positioned behind an LCD display panel, such as display panel 240. When the LCD display device 200, such as, for example, an LCD television, is turned on, the LEDs on the LED backlighting panel 220 create backlighting and the backlight is visible by a viewer from the front of the LCD device on the display panel 240. There are several other panels placed between the LED backlighting panel 220 and the LCD display panel 240, such as a diffuser plate 230.

The portable light-detecting portion 110 is used to measure the LED light output in one area of the display surface for example area 250 of the LCD display panel 240. The portable light-detecting portion 110 measures at least a portion of the surface of the display panel 240. In an embodiment, portable light-detecting portion 110 to measures a specific area of the display surface that correlates to a particular light source. The portion of the display surface that most accurately reflects the light output of a particular LED is the portion of the LCD display surface that is directly in front of that LED. The LED 210 correlates with area 250.

In some embodiments, the portable light-detecting portion 110 is not required to be in direct physical contact with the target portion of the LCD display panel surface 240 and only needs to be sufficiently close to the target surface so that the light-output is detected and accurately measured.

The portable light-detecting portion 110 is connected to the driver 150 in the LCD display device 200 via the connection 160. In some embodiments, the connection 160 is an electrical or optical transmission line, for example an electrical cable, a fiber optic cable or a light guide. In some embodiments, the connection 160 is a wireless connection, for example a radio link or a free space infrared link or BLUETOOTH link. To calibrate the light output of LED 210, the portable light-detecting portion 110 measures the light output by the LED 210 at area 250. Based on the measured light output, the portable light-detecting portion 110 instructs the driver 150 to adjust an amount of electrical power or current or voltage to the corresponding LED 210 in the backlighting plate 220 of the LCD display device 200.

The above measurement and adjustment continues until the light measured at area 250 reaches a predetermined threshold value stored in the controller 140 (FIG. 1) of light-detecting portion 110. The driver 150 stores a calibration value for the LED 210 in the memory 170 based on electrical power required to produce the predetermined threshold value. The stored calibration value for the LED 210 is used to calibrate the light output of LED 210 against other LEDs 205 in the backlighting plate 220 when the portable light-detecting portion 110 is not controlling the LED 210.

In the same manner, each of the LEDs 205 in the backlighting plate 220 are calibrated by the light-adjusting system 100, and a corresponding calibration value for each LED is stored in the memory 170.

In some embodiments, the predetermined threshold value is a preset value, for example a factory setting. The use of light-adjusting system 100 on the display device 200 with a preset factory value adjusts each LED to output an intensity that substantially matches the original factory value. Thus, in some cases an old display is adjusted to be as bright as a new display. In some embodiments, the predetermined threshold value is set to be the light intensity measured one of the LEDs 205 in the display device 200. Thus, in some embodiments, all of the LEDs in the display device 200 will be adjusted to be as bright as the one LED, and the display device 200 has uniform brightness. In some embodiments, the predetermined threshold value is set to be the light intensity measured for one of the LEDs 205 in a first display device 200. The light-adjusting system 100 is then used to calibrate a second display device 200. Thus, all of the LEDs in the second display device are adjusted to be as bright as the first display device 200, and the display devices have uniform brightness.

FIG. 3 is an edge-type LED backlighting display 300 in conjunction with which light-adjusting system 100 is used. Unlike panels with direct-type LED backlighting (in which LEDs are placed on a panel behind the display panel), display panels with edge-type LED backlighting comprise LEDs placed on one or more elongated bars that are positioned on the edges of the display panel.

LED backlighting display 300 has a number of LEDs 305 that are placed on an elongated LED light bar 320. In some embodiments, the LED light bar 320 is placed on the left side of the display panel 340. Display panels with edge-type LED backlighting are not limited to this particular configuration. In various embodiments, LED light bars 310 are placed at the left, the right, the top, the bottom or any combination of the left, the right, the top or the bottom edges of the display panel 340. In various embodiments, more than one LED light bar 310 is placed on an edge of the display panel 340.

The portable light-detecting portion 110 is connected to the driver 150 in the LCD display device 300 via the connection 160. In some embodiments, the connection 160 is an electrical or optical transmission line. In some embodiments, the connection 160 is a wireless connection. To calibrate the light output of LED 305, the portable light-detecting portion 110 measures the light output by the LED 310 at area 350.

Based on the measured light output, the portable light-detecting portion 110 instructs the driver 150 to adjust an amount of electrical power or current or voltage to the corresponding LED 310 in the LED light bar 320 of the LCD display device 300. The above measurement and adjustment continues until the light measured at area 350 reaches a predetermined threshold value. The driver 150 stores a calibration value for the LED 310 in the memory 170 based on electrical power or current or voltage required to produce the predetermined threshold value. The stored calibration value for the LED 310 is used to calibrate the light output of LED 310 with other LEDs in the LED light bar 320 when the portable light-detecting portion 110 is not controlling the LED 310.

In the same manner, in some embodiments, all of the LEDs 305 in the LED light bars 320 are calibrated by the light-adjusting system 100, and a corresponding calibration value for each LED stored in the memory 170.

In various embodiments, the predetermined threshold value is set using one or more of the methods described in relation to FIG. 2.

Figure 4:
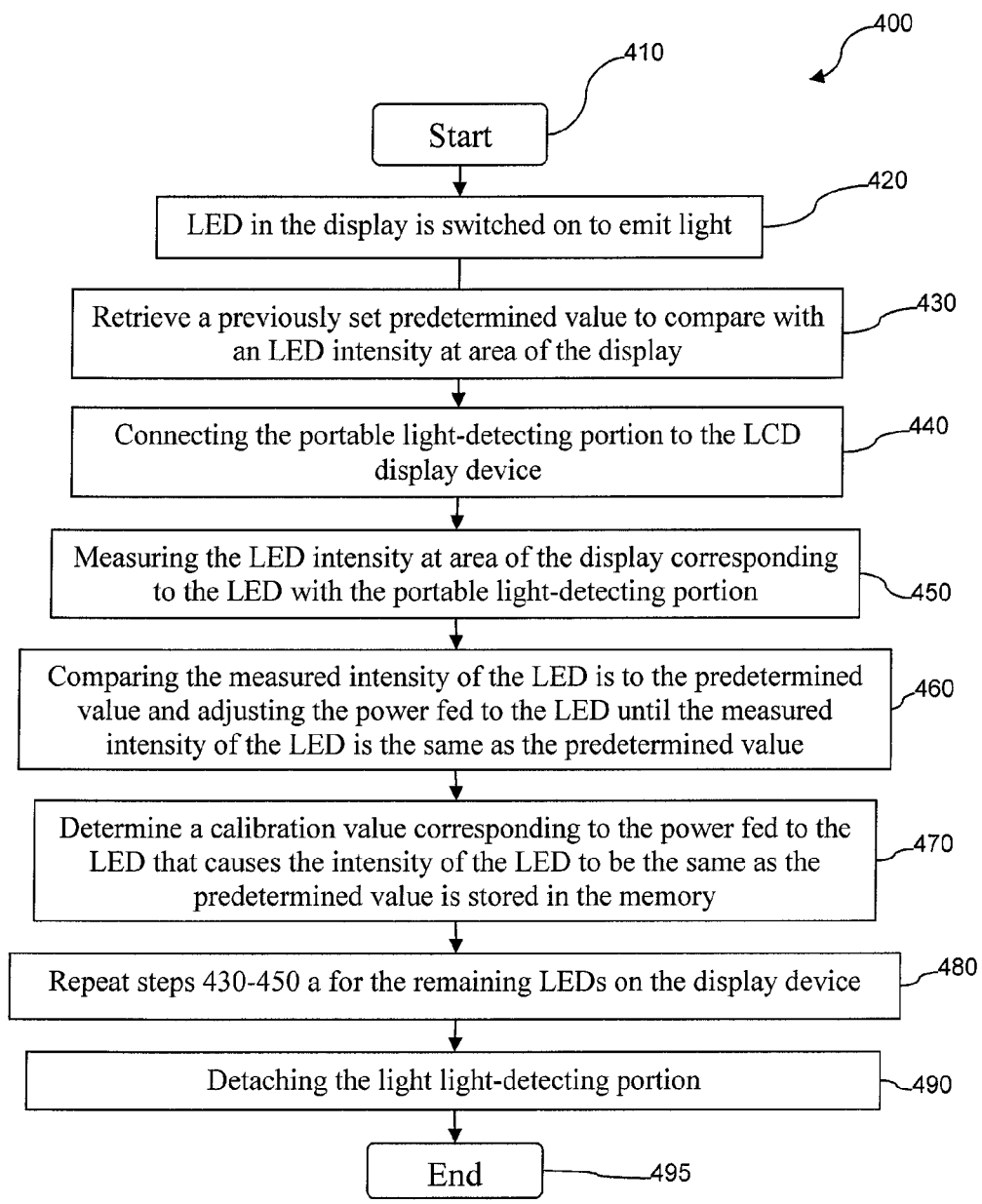
FIG. 4 is a flowchart of a method of using the system of FIG. 1 according to an embodiment.

FIG. 4 is a method 400 of calibrating the LCD display devices of FIGS. 2 and 3 using the light-adjusting system 100. The method begins at step 410 and proceeds to step 420.

In step 420, LED 210 or 310 in the LED-backlighting panel 220 or LED light bar 320 is switched on to emit light. Next, the method proceeds to step 430.

At step 430, a previously set predetermined threshold value is retrieved. The predetermined threshold value is used at step 460 to compare with an LED intensity at an area of the display measured by the portable light-detecting portion 110. Next, the method proceeds to step 440.

At step 440, the portable light-detecting portion 110 is connected to the LCD display device 200 or 300 by the connection 160. Next, the method proceeds to step 450.

At step 450, the intensity of the LED 210 or 310 is measured by the portable light-detecting portion 110 at the area 250 or 350 corresponding to the LED 210 or 310. Upon completion of the measurement the method proceeds to step 460.

At step 460, the measured intensity of the LED 210 or 310 is compared to the predetermined threshold value. The power fed to the LED is adjusted by driver 150 until the measured intensity of the LED substantially matches the predetermined threshold value. Upon completion of the adjustment the method proceeds to step 470.

At step 470, the power fed to the LED 210 or 310 that causes the intensity of the LED to match substantially the predetermined threshold value is stored as a calibration value in the memory 170 of the driver 150. After storing the calibration value the method proceeds to step 480.

At step 480, the steps 430-450 are repeated for the remaining LEDs on the display device 200 or 300. Upon completion of steps 430-450 for all of the LEDs the method proceeds to step 490.

At step 490, the portable light-detecting portion 110 is disconnected from the LCD display device 200 or 300. The method proceeds to step 495 where the method terminates.

Embodiments of the disclosure are applicable to LCD display devices, display such as plasma displays, direct LED displays in which each pixel is an LED or organic LED displays. Further, embodiments of the disclosure are applicable to warn an operator of a safety issue. LEDs are used for lighting and warning applications in, for example, cars, airplanes and trains. The system and method are applicable to measuring LED light intensity as detected on an exterior of a vehicle. For example, the system and method are applicable to measuring LED light intensity on the surface of a headlight casing for a car, comparing the measured light intensities to a specified baseline. The operator is warned if the measured light intensities are below the specified baseline, and the light output of the LEDs corrected to a required safe level.

The foregoing has outlined features of several embodiments. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A light adjusting system comprising:
   a light guide configured to collect light from a light source;
   a light detector coupled with the light guide;
   a controller electrically connected to an output of the light detector; and
   a driver for driving the light source, wherein the driver is coupled to an output of the controller, the driver comprising a memory that is configured to store a calibration value for the light source, the controller being configured to control the driver in response to the output of the light detector, wherein the controller is configured to update the calibration value that is stored in the memory while the controller is controlling the driver, and wherein the driver is configured to supply a correct power to the light source based on an updated stored calibration value when the controller is no longer controlling the driver.

2. The system of claim 1, wherein the light source is an LED.

3. The device of claim 1, wherein the driver is connected to the controller via a wired connection.

4. The system of claim 1, wherein the driver is connected to the controller via a wireless connection.

5. The system of claim 1, wherein the driver is connected to the controller via an optical connection.

6. The system of claim 5, wherein the optical connection is an optical fiber or a light pipe.

7. The system of claim 1, wherein the driver is configured to adjust an intensity of the light source.

8. The system of claim 1, wherein the light detector is at least one of a charge-coupled device or a complementary metal oxide semiconductor (CMOS) sensor.

9. The system of claim 1, wherein the light detector is at least one of a light intensity detector or a light color detector.

10. A display system comprising:
    a display device comprising:
      at least one LED; and
      at least one driver for driving the LED, the driver comprising a memory configured to store a calibration value for the LED;
    a light guide configured to collect light from the at least one LED;
    a light detector attached to the light guide; and
    a controller electrically connected to an output of the light detector and connected to an input of the driver;
    wherein the controller is configured to update the calibration value in the memory while the controller is connected to the input of the driver, and wherein the driver is configured to supply a correct power to the display device based on an updated calibration value that is stored in the memory when the controller is no longer connected to the input of the driver.

11. The display system of claim 10, wherein the driver is connected to the controller via a wired connection.

12. The display system of claim 10, wherein the driver is connected to the controller via a wireless connection.

13. The display system of claim 10, wherein the controller is connected to the driver via an optical connection.

14. The display system of claim 13, wherein the optical connection is an optical fiber or a light pipe.

15. The display system of claim 10, wherein the light detector is at least one of a light intensity detector or a light color detector.

16. A method comprising:
   measuring a light output at a display surface of a display device;
   comparing, via a controller, the measured light output to a predetermined threshold value;
   adjusting, via a driver being controlled by the controller, a light source in the display device so that the measured light output matches the predetermined threshold value;
   storing, in an electronic memory, a calibration value based on the adjusted light output, wherein the storing comprises updating the calibration value and storing an updated calibration value in the electronic memory; and
   driving, via the driver, the light source with the updated calibration value in response to the driver being disconnected from the controller.

17. The method of claim 16, wherein the predetermined threshold value is a preset value for the display device.

18. The method of claim 16, wherein the predetermined threshold value is based on a measured value of a light output at a predetermined portion of the display surface.

19. The method of claim 16, wherein the predetermined threshold value is based on a measured value of a light output at a display surface of a different display.

20. The method of claim 16, the method further comprises attaching a portable light-detecting portion for measuring the light output of the display surface before measuring the light output of the display surface and detaching the portable light-detecting portion after storing the calibration.

* * * * *